(12) United States Patent
Shen et al.

(10) Patent No.: US 11,194,812 B2
(45) Date of Patent: Dec. 7, 2021

(54) EFFICIENT AGGREGATION OF SLIDING TIME WINDOW FEATURES

(71) Applicant: Microsoft Technology Licensing, LLC, Redmond, WA (US)

(72) Inventors: Min Shen, Sunnyvale, CA (US); Maneesh Varshney, San Jose, CA (US); David J. Stein, Mountain View, CA (US); Jian Qiao, San Mateo, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 514 days.

(21) Appl. No.: 16/234,331

(22) Filed: Dec. 27, 2018

(65) Prior Publication Data

US 2020/0210430 A1 Jul. 2, 2020

(51) Int. Cl.
*G06F 16/00* (2019.01)
*G06F 16/2455* (2019.01)
*G06F 16/2458* (2019.01)
*G06F 16/22* (2019.01)
*G06F 16/23* (2019.01)

(52) U.S. Cl.
CPC ...... *G06F 16/24556* (2019.01); *G06F 16/221* (2019.01); *G06F 16/2322* (2019.01); *G06F 16/2456* (2019.01); *G06F 16/2477* (2019.01)

(58) Field of Classification Search
None
See application file for complete search history.

(56) References Cited

U.S. PATENT DOCUMENTS

| | | | | |
|---|---|---|---|---|
| 2015/0347568 A1* | 12/2015 | Chen | ...................... | G06F 16/287 707/722 |
| 2016/0070761 A1* | 3/2016 | Viel | .................. | G06F 16/24568 707/713 |
| 2019/0102436 A1* | 4/2019 | Bishnoi | ................. | G06F 16/244 |

OTHER PUBLICATIONS

Sadekar, et al., A seminar presentation entitled "Fact Store at Scale for Netflix Recommendations", Retrieved from: https://databricks.com/session/fact-store-scale-for-netflix-recommendations, Feb. 6, 2019.

Nene, et al., A seminar presentation entitled "Large Scale Feature Aggregation Using Apache Spark", Retrieved from: https://databricks.com/session/large-scale-feature-aggregation-using-apache-spark, Feb. 6, 2019.

* cited by examiner

*Primary Examiner* — Anhtai V Tran
(74) *Attorney, Agent, or Firm* — NDWE, LLP.

(57) ABSTRACT

The disclosed embodiments provide a system for processing data. During operation, the system organizes fact data to be aggregated into sliding time window features and observation data associated with the fact data into a set of partitions based on a join key. Next, the system sorts the fact data and the observation data within the set of partitions by the join key and timestamps associated with the fact data and the observation data. For each observation record in the observation data, the system aggregates fact records in the sorted fact data that share a value of the join key with the observation record and that fall within a first time window associated with the observation record to produce a sliding time window feature. The system then stores the sliding time window feature in association with the observation record.

20 Claims, 4 Drawing Sheets

EFFICIENT AGGREGATION OF SLIDING TIME WINDOW FEATURES

RELATED APPLICATION

The subject matter of this application is related to the subject matter in a co-pending non-provisional application entitled "Common Feature Protocol for Collaborative Machine Learning," having Ser. No. 15/046,199 and filing date 17 Feb. 2016.

BACKGROUND

Field

The disclosed embodiments relate to data analysis. More specifically, the disclosed embodiments relate to techniques for performing efficient aggregation of sliding time window features.

Related Art

Analytics may be used to discover trends, patterns, relationships, and/or other attributes related to large sets of complex, interconnected, and/or multidimensional data. In turn, the discovered information may be used to gain insights and/or guide decisions and/or actions related to the data. For example, business analytics may be used to assess past performance, guide business planning, and/or identify actions that may improve future performance.

However, significant increases in the size of data sets have resulted in difficulties associated with collecting, storing, managing, transferring, sharing, analyzing, and/or visualizing the data in a timely manner. For example, conventional software tools and/or storage mechanisms may be unable to handle petabytes or exabytes of loosely structured data that is generated on a daily and/or continuous basis from multiple, heterogeneous sources. Instead, management and processing of "big data" may require massively parallel software running on a large number of physical servers. In addition, querying of large data sets may result in high server latency and/or server timeouts (e.g., during processing of requests for aggregated data), and/or the crashing of client-side applications such as web browsers (e.g., due to high data volume).

Consequently, big data analytics may be facilitated by mechanisms for efficiently and/or effectively collecting, storing, managing, querying, analyzing, and/or visualizing large data sets.

BRIEF DESCRIPTION OF THE FIGURES

In the figures, like reference numerals refer to the same figure elements.

DETAILED DESCRIPTION

Figure 1:
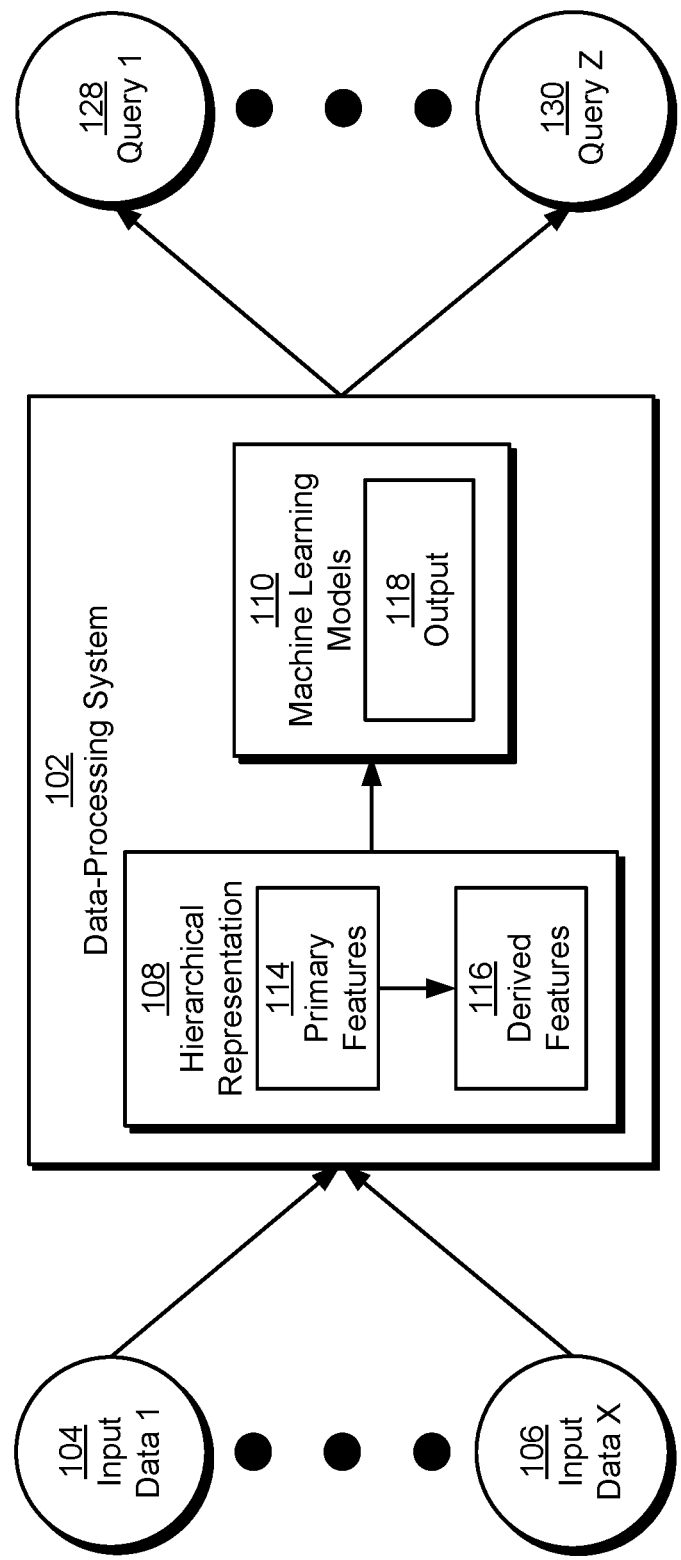
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for efficiently aggregating sliding time window features. In some embodiments, sliding time window features are generated from aggregations of fact data based on time windows that are determined by observations related to the fact data. The fact data may include a time series of events and/or metrics that are collected for a given entity (e.g., member, company, job, etc.). The observations may include outcomes, labels, queries, and/or other time-based events from which sliding time windows are derived and applied to the fact data to calculate sliding time window features.

For example, fact data for a user may include page views, clicks, searches, and/or other actions performed by the user at different times. Observation data for the user may include labels representing outcomes associated with the fact data, such as whether or not the user applied to jobs related to the actions. Records of the actions may then be summed, averaged, counted, and/or otherwise aggregated by time windows preceding the labels to produce sliding time window features reflecting the user's activity preceding the outcomes.

To expedite calculation of sliding time window features, the fact data and observation data are organized into partitions based on join keys associated with the fact and observation data. For example, fact records and observation records may be partitioned by entity keys (e.g., member identifiers (IDs), company IDs, job IDs, etc.) shared by the fact and observation records. Within each partition, records may initially be sorted by entity key, and subsets of records with the same entity key may be sorted by timestamp.

Partitions containing fact records and observation records with the same join keys are collocated, and one or more sliding time window features are calculated for each observation record by aggregating fact records with the same join key value as the observation record and that have timestamps that fall within the time windows associated with the sliding time window features. The process may be repeated for all observation records in all partitions.

By generating sliding time window features from partitioned, sorted, and/or collocated fact data and observation data, the disclosed embodiments may perform or facilitate distributed computations related to the sliding time window features in quadratic time. In contrast, conventional techniques that use nearline processing pipelines to produce sliding time window features may incur time delays between initiation of the pipelines and training of machine learning models using sliding time window features produced by the pipelines. Moreover, naïve techniques that produce sliding time windows features using complex joins may carry out the joins using Cartesian products, which are computationally infeasible for large data sets. Consequently, the disclosed embodiments may improve the efficiency and/or performance of computer systems, applications, and/or technologies for generating features, aggregating data, and/or performing machine learning.

Efficient Aggregation of Sliding Time Window Features

FIG. 1 shows a schematic of a system in accordance with the disclosed embodiments. The system includes a data-processing system 102 that analyzes one or more sets of input data (e.g., input data 1 104, input data x 106). For example, data-processing system 102 may create and train one or more machine learning models 110 for analyzing input data related to users, organizations, applications, job postings, purchases, electronic devices, websites, content, sensor measurements, and/or other categories. Machine learning models 110 may include, but are not limited to, regression models, artificial neural networks, support vector machines, decision trees, naïve Bayes classifiers, Bayesian networks, deep learning models, hierarchical models, and/or ensemble models.

The results of such analysis may be used to discover relationships, patterns, and/or trends in the data; gain insights from the input data; and/or guide decisions or actions related to the data. For example, data-processing system 102 may use machine learning models 110 to generate output 118 that includes scores, classifications, recommendations, estimates, predictions, and/or other properties. Output 118 may be inferred or extracted from primary features 114 in the input data and/or derived features 116 that are generated from primary features 114 and/or other derived features. For example, primary features 114 may include profile data, user activity, sensor data, and/or other data that is extracted directly from fields or records in the input data. The primary features 114 may be aggregated, scaled, combined, and/or otherwise transformed to produce derived features 116, which in turn may be further combined or transformed with one another and/or the primary features to generate additional derived features. After output 118 is generated from one or more sets of primary and/or derived features, output 118 is provided in responses to queries (e.g., query 1 128, query z 130) of data-processing system 102. In turn, the queried output 118 may improve revenue, interaction with the users and/or organizations, use of the applications and/or content, and/or other metrics associated with the input data.

In one or more embodiments, data-processing system 102 uses a hierarchical representation 108 of primary features 114 and derived features 116 to organize the sharing, production, and consumption of the features across different teams, execution environments, and/or projects. Hierarchical representation 108 may include a directed acyclic graph (DAG) that defines a set of namespaces for primary features 114 and derived features 116. The namespaces may disambiguate among features with similar names or definitions from different usage contexts or execution environments. Hierarchical representation 108 may include additional information that can be used to locate primary features 114 in different execution environments, calculate derived features 116 from the primary features and/or other derived features, and track the development of machine learning models 110 or applications that accept the derived features as input.

Consequently, data-processing system 102 may implement, in hierarchical representation 108, a common feature protocol that describes a feature set in a centralized and structured manner, which in turn can be used to coordinate large-scale and/or collaborative machine learning across multiple entities and machine learning models 110. Common feature protocols for large-scale collaborative machine learning are described in a co-pending non-provisional application entitled "Common Feature Protocol for Collaborative Machine Learning," having Ser. No. 15/046,199, and filing date 17 Feb. 2016, which is incorporated herein by reference.

In one or more embodiments, primary features 114 and/or derived features 116 are obtained and/or used with an online professional network, social network, or other online network of users that is used by a set of entities to interact with one another in a professional, social, and/or business context. The entities may include users that use the online network to establish and maintain professional connections, list work and community experience, endorse and/or recommend one another, search and apply for jobs, and/or perform other actions. The entities may also include companies, employers, and/or recruiters that use the online network to list jobs, search for potential candidates, provide business-related updates to users, advertise, and/or take other action.

As a result, features 114 and/or derived features 116 may include member features, company features, and/or job features. The member features include attributes from the members' profiles with the online network, such as each member's title, skills, work experience, education, seniority, industry, location, and/or profile completeness. The member features also include each member's number of connections in the online network, the member's tenure on the online network, and/or other metrics related to the member's overall interaction or "footprint" in the online network. The member features further include attributes that are specific to one or more features of the online professional network, such as a classification of the member as a job seeker or non-job-seeker.

The member features may also characterize the activity of the members with the online network. For example, the member features may include an activity level of each member, which may be binary (e.g., dormant or active) or calculated by aggregating different types of activities into an overall activity count and/or a bucketized activity score. The member features may also include attributes (e.g., activity frequency, dormancy, total number of user actions, average number of user actions, etc.) related to specific types of social or online professional network activity, such as messaging activity (e.g., sending messages within the online network), publishing activity (e.g., publishing posts or articles in the online network), mobile activity (e.g., accessing the online network through a mobile device), job search activity (e.g., job searches, page views for job listings, job applications, etc.), and/or email activity (e.g., accessing the online network through email or email notifications).

The company features include attributes and/or metrics associated with companies. For example, company features for a company may include demographic attributes such as a location, an industry, an age, and/or a size (e.g., small business, medium/enterprise, global/large, number of employees, etc.) of the company. The company features may further include a measure of dispersion in the company, such as a number of unique regions (e.g., metropolitan areas, counties, cities, states, countries, etc.) to which the employees and/or members of the online professional network from the company belong.

A portion of company features may relate to behavior or spending with a number of products, such as recruiting, sales, marketing, advertising, and/or educational technology solutions offered by or through the online network. For example, the company features may also include recruitment-based features, such as the number of recruiters, a potential spending of the company with a recruiting solution, a number of hires over a recent period (e.g., the last 12 months), and/or the same number of hires divided by the total number of employees and/or members of the online network in the company. In turn, the recruitment-based features may be used to characterize and/or predict the company's behavior or preferences with respect to one or more variants of a recruiting solution offered through and/or within the online network.

The company features may also represent a company's level of engagement with and/or presence on the online network. For example, the company features may include a number of employees who are members of the online network, a number of employees at a certain level of seniority (e.g., entry level, mid-level, manager level, senior level, etc.) who are members of the online network, and/or a number of employees with certain roles (e.g., engineer, manager, sales, marketing, recruiting, executive, etc.) who are members of the online network. The company features may also include the number of online network members at the company with connections to employees of the online network, the number of connections among employees in the company, and/or the number of followers of the company in the online network. The company features may further track visits to the online network from employees of the company, such as the number of employees at the company who have visited the online network over a recent period (e.g., the last 30 days) and/or the same number of visitors divided by the total number of online network members at the company.

One or more company features may additionally be derived features 116 that are generated from member features. For example, the company features may include measures of aggregated member activity for specific activity types (e.g., profile views, page views, jobs, searches, purchases, endorsements, messaging, content views, invitations, connections, recommendations, advertisements, etc.), member segments (e.g., groups of members that share one or more common attributes, such as members in the same location and/or industry), and companies. In turn, the company features may be used to glean company-level insights or trends from member-level online professional network data, perform statistical inference at the company and/or member segment level, and/or guide decisions related to business-to-business (B2B) marketing or sales activities.

The job features describe and/or relate to job listings and/or job recommendations within the online network. For example, the job features may include declared or inferred attributes of a job, such as the job's title, industry, seniority, desired skill and experience, salary range, and/or location. One or more job features may also be derived features 116 that are generated from member features and/or company features. For example, the job features may provide a context of each member's impression of a job listing or job description. The context may include a time and location (e.g., geographic location, application, website, web page, etc.) at which the job listing or description is viewed by the member. In another example, some job features may be calculated as cross products, cosine similarities, statistics, and/or other combinations, aggregations, scaling, and/or transformations of member features, company features, and/or other job features.

In one or more embodiments, primary features 114 and/or derived features 116 include sliding time window features that are generated from aggregations of fact data based on time windows that are determined by observations related to the fact data. The fact data may include a time series of events and/or metrics that are collected for a given entity (e.g., member, company, job, etc.). The observations may include outcomes, labels, queries, and/or other time-based events from which sliding time windows are derived and applied to the fact data to calculate sliding time window features. In turn, the sliding time window features may include sums, counts, averages, medians, quantiles, weighted aggregations (e.g., time-decayed aggregations that weight fact data by time-based decay factors), and/or other types of aggregations of the fact data by time windows derived from the observations.

For example, fact data for a member may be stored in a table with the following representation:

| Member ID | Time | Page Views |
| --- | --- | --- |
| 1 | 8:00 | 2 |
| 1 | 8:35 | 1 |
| 1 | 9:10 | 3 |

In the above table, a member with a unique identifier (ID) of 1 has three records of page views associated with three different times: two page views at 8:00, one page view at 8:35, and three page views at 9:10.

Continuing with the above example, observation data for the member may be stored in a table with the following representation:

| Member ID | Time | Label |
| --- | --- | --- |
| 1 | 8:50 | T |
| 1 | 9:05 | F |
| 1 | 9:15 | T |

The above table includes three records of labels for the same member ID of 1 at three different times: a label of "T" at 8:50, a label of "F" at 9:05, and a label of "T" at 9:15.

Aggregations of the member's fact data by the observation data may be generated over a sliding time window of one hour preceding each observation to produce sliding time window features with the following representation:

| Member ID | Time | Label | Feature |
| --- | --- | --- | --- |
| 1 | 8:50 | T | 3 |
| 1 | 9:05 | F | 1 |
| 1 | 9:15 | T | 4 |

The representation above includes the same values of member ID, time, and label as the observation data. The representation includes an additional column storing values of a feature, which is calculated by aggregating page views from the fact data by one-hour windows preceding each label. The first feature value of "3" is calculated by summing two page views at 8:00 and one page view at 8:35 within the one-hour window preceding the "T" label at 8:50. The second feature value of "1" is calculated as the single page view at 8:35 within the one-hour preceding the "F" label at 9:05. The third feature value of "4" is summing by summing the page view at 8:35 with three page views at 9:10 within the one-hour window preceding the "T" label at 9:15.

Those skilled in the art will appreciate that sliding time window features are commonly associated with time gaps over which fact data and observation data are collected before the sliding time window features can be used with machine learning models. For example, a machine learning model may require 30 days of sliding time window features with a window size of 10 days. A pipeline may be deployed in a nearline environment to produce the sliding time window features from raw events as the events are generated and/or collected by the nearline environment. The sliding time window features may subsequently be transferred to an offline data store using an extract, transform, and load (ETL) process before the features can be used with the machine learning model. Because the features are generated as facts and observations related to the features are received, a minimum of 40 days (30 days of features+10 days over which each feature is aggregated) may be required to generate sufficient training data for the machine learning model. Moreover, a change to the window size feature and/or addition of a new sliding time window feature may require deployment of a new pipeline into the nearline environment, which involves an additional time gap prior to use of the feature(s) with the machine learning model.

In one or more embodiments, data-processing system 102 includes functionality to efficiently calculate sliding time window features from previously collected fact and observation data. For example, data-processing system 102 may generate the sliding time window features from records of facts and observations in an offline data store instead of a nearline environment, which may allow the features to be "backfilled" from historical data that spans a long time range instead of from newly generated records.

Figure 2:
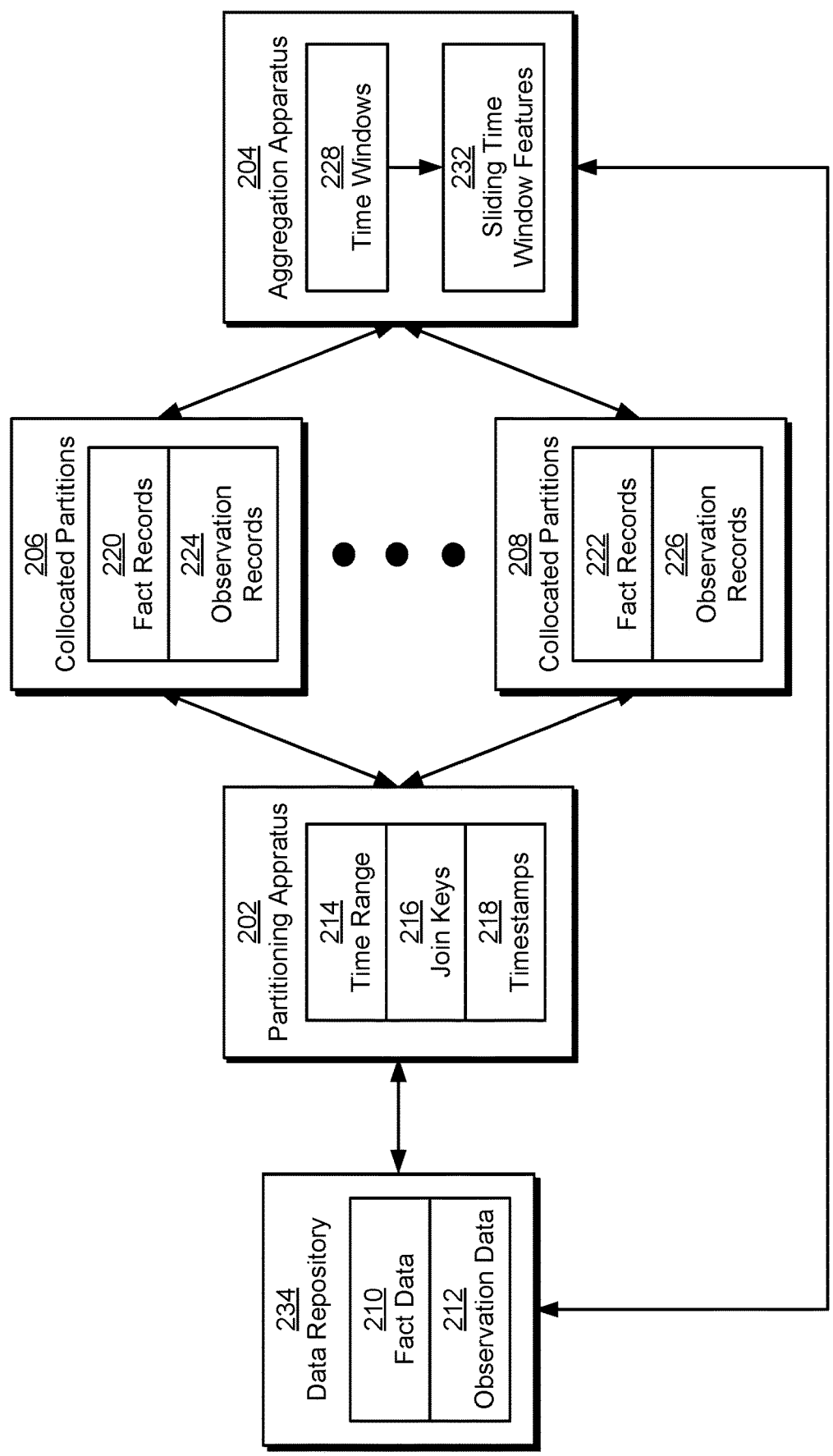
FIG. 2 shows a system for processing data in accordance with the disclosed embodiments.

As shown in FIG. 2, a system for processing data (e.g., data-processing system 102 of FIG. 1) includes a partitioning apparatus 202 and an aggregation apparatus 204. Partitioning apparatus 202 and aggregation apparatus 204 operate on fact data 210 and observation data 212 from a data repository 234 to generate sliding time window features 232 based on time windows 228 associated with observation data 212.

In one or more embodiments, partitioning apparatus 202 and/or aggregation apparatus 204 access historical fact data 210 and observation data 212 from a distributed filesystem, data warehouse, database, one or more flat files, and/or other type of offline data store providing data repository 234. As a result, fact data 210 and observation data 212 may span a range of time that is greater than the time range required to produce sufficient training data for one or more machine learning models.

Observation data 212 includes observation records 224-226 containing observations and timestamps 218 associated with the observations. For example, observation data 212 may include records of labels associated with members, jobs, companies, and/or other entities represented in an online system. Each record may include a value of a label (e.g., a positive or negative outcome), as well as one or more entity keys associated with the label (e.g., IDs of one or more members, jobs, and/or companies associated with the outcome).

Fact data 210 includes fact records 220-222 containing events and/or metrics related to the corresponding entities, as well as timestamps 218 associated with the events/metrics. For example, fact data 210 may include records of impressions, clicks, searches, user sessions, posts, comments, likes, job applications, messages, and/or other actions performed by and/or applied to the entities. Each record may identify a type of action (e.g., a post), an entity performing the action (e.g., a member submitting the post), an entity to which the action is applied (e.g., another member viewing the post), and/or another entity related to the action (e.g., a job or article in the post). Each record may additionally include a metric related to the action (e.g., a count of the action over a one-minute or five-minute period).

Partitioning apparatus 202 organizes fact records 220-222 in fact data 210 and observation records 224-226 in observation data 212 into a number of collocated partitions 206-208. First, partitioning apparatus 202 determines a time range 214 associated with fact data 210. For example, partitioning apparatus 202 may first iterate through observation records 224-226 in observation data 212 to determine the range of timestamps in observation records 224. Within the range of timestamps 218 found in observation records 224, partitioning apparatus 202 may determine time range 214 for fact data 210 using one or more time windows 228 associated with sliding time window features 232 to be generated based on the observation record. Thus, time range 214 may span all timestamps 218 in observation records 224 and/or additional time windows 228 that extend beyond the timestamps. Creation of time windows 228 based on timestamps 218 in observation records 224 is discussed in further detail below.

Next, partitioning apparatus 202 filters fact data 210 by time range 214. For example, partitioning apparatus 202 may exclude fact records 220-222 with timestamps 218 that do not fall within the determined time range 214 from fact data 210 that is retrieved from data repository 234.

Partitioning apparatus 202 then organizes fact records 220-222 from the filtered fact data 210 and observation records 224-226 into partitions based on join keys 216 associated with fact data 210 and observation data 212 and timestamps 218 in fact records 220-222 and observation records 224-226. For example, partitioning apparatus 202 may divide fact data 210 into multiple partitions of fact records 220-222 and observation data 212 into multiple partitions of observation records 224-226. Each partition of fact records 220-222 may contain a subset of join keys 216 and all fact records with that subset of join keys 216. Each partition of observation records 224-226 may contain a subset of join keys 216 and all observation records with that subset of join keys 216.

Partitioning apparatus 202 further sorts the partitioned fact records 220-222 and observation records 224-226 by join keys 216 and timestamps 218. For example, partitioning apparatus 202 may perform, within each partition, a primary sort of fact records 220-222 or observation records 224-226 in the partition by join keys 216. Partitioning apparatus 202 may then perform a secondary sort of records with the same join key by timestamps 218. In other words, each partition may have multiple "batches" of records that are ordered by join keys 216. Within each batch, records may have the same join key and be ordered by timestamp.

Partitioning apparatus 202 then generates collocated partitions 206-208 of fact records 220-222 and observation records 224-226, with each set of collocated partitions containing a subset of fact records 220-222 and observation records 224-226 with the same join keys 216. For example, partitioning apparatus 202 may produce collocated partitions 206 as one or more partitions of fact records 220 and one or more partitions of observation records 224 on the same processing node (e.g., machine, virtual machine, processor, processor core, etc.). Similarly, partitioning apparatus 202 may produce collocated partitions 208 as one or more partitions of fact records 222 and one or more partitions of observation records 226 on a different processing node. Fact records 220 and observation records 224 in collocated partitions 206 may share a subset of join keys 216, and fact records 222 and observation records 226 in collocated partitions 208 may share another subset of join keys 216.

Aggregation apparatus 204 uses sorted fact records 220-222 and observation records 224-226 in collocated partitions 206-208 and one or more time windows 228 to calculate the corresponding sliding time window features 232. Each time window includes a beginning and end that are based on a given observation record's timestamp. For example, an instance of aggregation apparatus 204 may set the beginning (or end) of a one-hour time window to the timestamp in the observation record and compute the end (or beginning) of the time window by adding (or subtracting) one hour from the timestamp. Aggregation apparatus 204 may also, or instead, shift the time window so that the timestamp is in the middle of the time window (i.e., the beginning of the time window is 30 minutes before the timestamp and the end of the time window is 30 minutes after the timestamp). Aggregation apparatus 204 may also, or instead, separate the time window from the timestamp by a certain amount (e.g., setting the beginning of the time window to one hour after the timestamp and/or the end of the time window to one hour before the timestamp). Aggregation apparatus 204 may repeat the process with other time windows 228 associated with the observation records (e.g., additional time windows 228 from which sliding time window features 232 are to be calculated based on the observation records).

Continuing with the above example, an instance of aggregation apparatus 204 may execute on each processing node on which a set of collocated partitions 206-208 resides. For each set of time-sorted observation records that share a join key on each processing node, aggregation apparatus 204 may cache time-sorted fact records with the same join key. Aggregation apparatus 204 may then calculate sliding time window features 232 for the observation records by iterating through the observation records, determining a beginning and end of a time window for each observation record, identifying a subset of the time-sorted cached fact records that fall within the time window, and aggregating the subset of fact records into a sliding time window feature for the observation record. If the observation record is associated with multiple time windows (e.g., time windows that span different numbers of days, weeks, or months), aggregation apparatus 204 may match each time window to a different subset of cached fact records and calculate a corresponding sliding window feature from the subset of cached fact records. When sliding time window features 232 are generated on the same processing node for multiple observation records that share the same join key, aggregation apparatus 204 may calculate these sliding time window features in an incremental fashion. This is done by calculating the next observation record's sliding time window features 232 based on the values of sliding time window features 232 for the previous observation record, by only considering the fact records that move out of/into the corresponding time windows.

After one or more sliding time window features 232 are calculated for a given observation record, aggregation apparatus 204 stores the sliding time window feature(s) in association with the observation record. For example, aggregation apparatus 204 may store the sliding time window feature(s) in one or more fields added to the observation record in data repository 234. In another example, aggregation apparatus 204 may store the sliding time window feature(s) in one or more additional records in data repository 234 and link the record(s) with the observation record (e.g., by storing the join key from the observation record in the additional record(s)).

Aggregation apparatus 204 and/or another component of the system may additionally input sliding time window features 232 and labels from the corresponding observation records 224-226 as training data for one or more machine learning models. For example, the component may combine sliding time window features 232 with additional features, input the features into a machine learning model, and update the parameters of the machine learning model so that the machine learning model predicts the corresponding labels.

Partitioning apparatus 202 and aggregation apparatus 204 may repeat the process to produce sliding time window features 232 from additional join keys 216 associated with fact data 210 and observation data 212. For example, observation records in observation data 212 may include dimensions representing a viewer of a notification, an actor that performed an action triggering the notification, and a notification type of the notification. Sliding time window features 232 may be generated from four different combinations of join keys 216 represented by the dimensions (e.g., viewer and actor, viewer and notification, actor and notification, viewer and actor and notification). Sliding time window features 232 may additionally be associated with four different types of fact data 210 (e.g., four different types of actions related to notifications between viewers and actors), six different time windows 228, and five different aggregation types.

Continuing with the above example, the system of FIG. 2 may perform four iterations of processing involving partitioning apparatus 202 and aggregation apparatus 204 to produce sliding time window features 232 for all four combinations of join keys 216. During each iteration, partitioning apparatus 202 may partition observation data 212 and fact data 210 by a different combination of join keys 216. Partitioning apparatus 202 may sort the partitioned fact records 220-222 and observation records 224-226 by the join key combination and timestamps 218 and collocate partitioned records with the same join key combination. Aggregation apparatus 204 may then iterate through observation records 224-226 in each partition and calculate a separate sliding window feature for each of the four types of fact data 210, each of the six time windows 228, and each of the five different aggregation types, resulting in 120 (4*6*5) different sliding window feature values for each observation record. After all 120 sliding window features 232 have been calculated for all observation records 224-226 and a given join key combination, partitioning apparatus 202 may repartition and re-sort fact data 210 and observation data 212 by another combination of join keys, and aggregation apparatus 204 may calculate 120 more sliding window features 232 from the corresponding fact records 220 and observation records 226.

By generating sliding time window features from partitioned, sorted, and/or collocated fact data and observation data, the system of FIG. 2 may perform distributed computations related to the sliding time window features in quadratic time. In contrast, conventional techniques that use nearline processing pipelines to produce sliding time window features may incur time delays between initiation of the pipelines and training of machine learning models using sliding time window features produced by the pipelines. Moreover, naïve techniques that produce sliding time windows features using complex joins may carry out the joins using Cartesian products, which are computationally infeasible for large data sets. Consequently, the disclosed embodiments may improve the efficiency and/or performance of computer systems, applications, and/or technologies for generating features, aggregating data, and/or performing machine learning.

Those skilled in the art will appreciate that the system of FIG. 2 may be implemented in a variety of ways. First, partitioning apparatus 202, aggregation apparatus 204, and/or data repository 234 may be provided by a single physical machine, multiple computer systems, one or more virtual machines, a grid, one or more databases, one or more filesystems, and/or a cloud computing system. Partitioning apparatus 202 and aggregation apparatus 204 may additionally be implemented together and/or separately by one or more hardware and/or software components and/or layers. Moreover, one or more instances of partitioning apparatus 202 and/or aggregation apparatus 204 may be distributed across a set of processing nodes to perform partitioning and/or aggregation of fact data 210 and/or observation data 212 in a distributed manner.

Second, the system of FIG. 2 may generate or use sliding time window features 232 separately from machine learning models that are trained and/or executed using sliding time window features 232. For example, partitioning apparatus 202 and aggregation apparatus 204 may generate a time series of "sliding window metrics" from fact data 210 and observation data 212 containing timestamps associated with the time series and/or sliding windows. In turn, the time series may be analyzed to determine trends, cycles, seasonality, and/or other time-based patterns in fact data 210.

Figure 3:
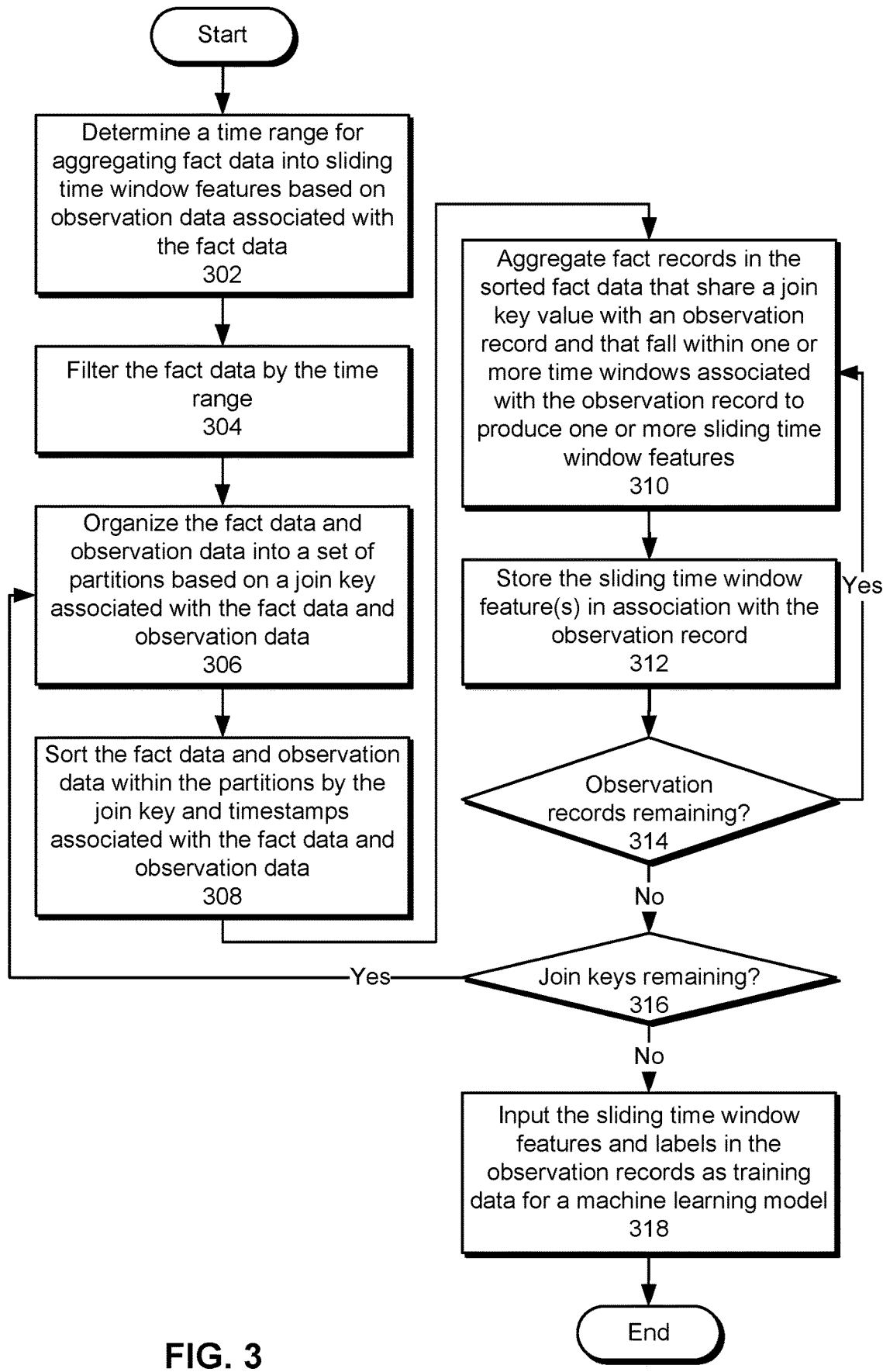
FIG. 3 shows a flowchart illustrating a process of aggregating sliding time window features in accordance with the disclosed embodiments.

FIG. 3 shows a flowchart illustrating a process of aggregating sliding time window features in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a time range for aggregating fact data into sliding time window features associated with the observation data is determined (operation 302). For example, the observation data may include observation records containing labels and timestamps. The fact data time range may be calculated from the timestamps of observation records and one or more time windows associated with sliding time window features to be generated based on the observation record.

Next, the fact data is filtered by the time range (operation 304). For example, the fact data may be filtered to remove fact records with timestamps that lie outside the time range.

The fact data and observation data are organized into a set of partitions based on a join key associated with the fact data and observation data (operation 306). For example, the fact data and observation data may be partitioned by values of the join key, so that each partition contains all fact records or observation records that have the same join key. Partitions of fact data may also be collocated on the same processing nodes as partitions of observation data that share join key values as the fact data.

The fact data and observation data are also sorted within the partitions by the join key and timestamps associated with the fact data and observation data (operation 308). For example, records in each partition may be sorted by values of the join key, and each subset of records with the same value of the join key in the partition may be further sorted by the timestamps. As a result, the partition may include multiple "batches" of records that are ordered by join key, with records in each batch ordered by timestamp.

Fact records in the sorted fact data that share a join key value with an observation record and that fall within one or more time windows associated with the observation record are then aggregated to produce one or more sliding time window features (operation 310), and the sliding time window feature(s) are stored in association with the observation record (operation 312). The process may be repeated for remaining observation records (operation 314) in every partition.

For example, observation records in a given partition may be processed in the order in which the observation records are sorted (i.e., by join key and by timestamp within each join key). Each batch of observation records with the same join key may be matched to a set of fact records with the join key, and the fact records may be stored in a cache. A subset of cached fact records that fall within the boundaries of an observation record's time window may then be aggregated (e.g., summed, counted, averaged, weighted, etc.) to produce a sliding time window feature for the time windows, and the sliding time window feature may be added to the observation record and/or stored in a separate record that is linked to the observation record. The process may be repeated for additional time windows associated with the observation record and additional observation records with the same join key. Once a new batch of observation records with a new join key (i.e., the next highest join key) is reached, a different set of fact records with the same join key may be cached, and time windows may be calculated for the batch of observation records and the corresponding cached fact records.

Operations 306-314 may be repeated for remaining join keys (operation 316) used to generate the sliding time window features. For example, the fact data and observation data may be associated with multiple join keys and/or combinations of join keys representing different members, jobs, companies, and/or other entities involved in activity and/or outcomes tracked by the fact data and observation data. Operations 306-314 may be performed for each join key and/or combination of join keys used to produce one or more sliding time window features from the fact data and observation data.

Figure 4:
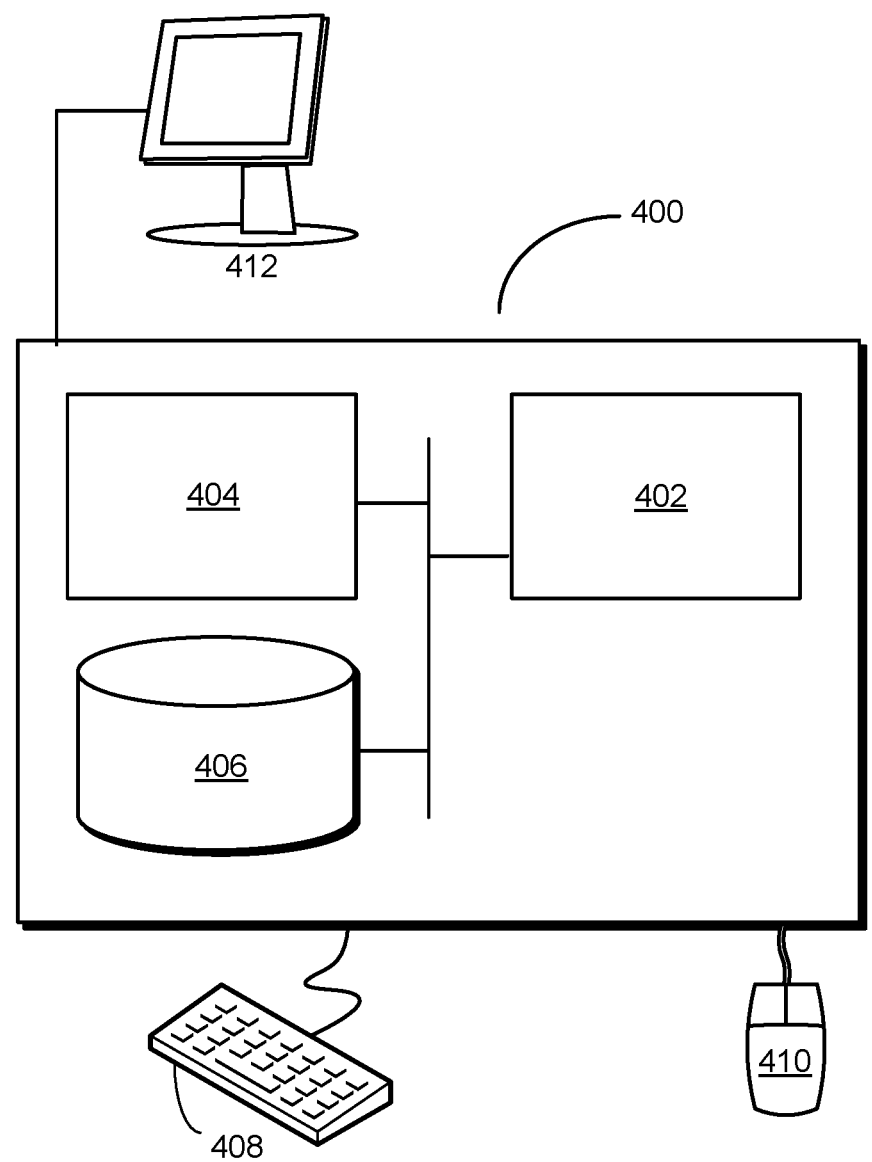
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for processing data. The system includes a partitioning apparatus and an aggregation apparatus, one or more of which may alternatively be termed or implemented as a module, mechanism, or other type of system component. The partitioning apparatus organizes fact data to be aggregated into sliding time window features and observation data associated with the fact data into a set of partitions based on a join key. Next, the partitioning apparatus sorts the fact data and the observation data within the set of partitions by the join key and timestamps associated with the fact data and the observation data. For each observation record in the observation data, the aggregation apparatus aggregates fact records in the sorted fact data that share a value of the join key with the observation record and that fall within a time window associated with the observation record to produce a sliding time window feature. The aggregation apparatus then stores the sliding time window feature in association with the observation record.

In addition, one or more components of computer system 400 may be remotely located and connected to the other components over a network. Portions of the present embodiments (e.g., partitioning apparatus, aggregation apparatus, data repository, data-processing system, etc.) may also be located on different nodes of a distributed system that implements the embodiments. For example, the present embodiments may be implemented using a cloud computing system that performs distributed computation of sliding time window features from observation data and fact data in an offline data store.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
organizing, by one or more computer systems, fact data to be aggregated into sliding time window features and observation data associated with the fact data into a set of partitions based on a first join key associated with the fact data and the observation data;
sorting the fact data and the observation data within the set of partitions by the first join key and timestamps associated with the fact data and the observation data;
for each observation record in the observation data, aggregating fact records in the sorted fact data that share a value of the first join key with the observation record and fall within a first time window associated with the observation record to produce a sliding time window feature; and
storing the sliding time window feature in association with the observation record.

2. The method of claim 1, further comprising:
determining, based on the observation data, a time range for aggregating the fact data into the sliding time window feature; and
filtering the fact data by the time range prior to organizing the fact data and the observation data into the set of partitions.

3. The method of claim 2, wherein determining the time windows for aggregating the fact data into the sliding time window feature comprises:
for each observation record in the observation data, selecting a beginning and an end of a time window associated with the observation record based on a timestamp in the observation record.

4. The method of claim 1, further comprising:
for each observation record in the observation data, aggregating the sorted fact data within a second time window associated with the observation record to produce an additional sliding time window feature.

5. The method of claim 1, further comprising:
reorganizing the fact data and the observation data into another set of partitions based on a second join key associated with the fact data and the observation data;
sorting the fact data and the observation data within the other set of partitions by the second join key and the timestamps; and
for each observation record in the observation data, aggregating the sorted fact data within a second time window associated with the observation record to produce an additional sliding time window feature.

6. The method of claim 1, further comprising:
inputting the sliding time window feature and a label in the observation record as training data for a machine learning model.

7. The method of claim 1, wherein organizing the fact data and the observation data into the set of partitions based on the first join key comprises:
partitioning the fact data and the observation data by values of the first join key; and
collocating a first partition of the fact data with a second partition of the observation data that shares a value of the first join key with the first partition of the fact data.

8. The method of claim 1, wherein sorting the fact data and the observation data by the first join key and the timestamps comprises:
sorting a set of records in a partition by values of the first join key; and
sorting each subset of the records with a common value of the first join key in the partition by the timestamps.

9. The method of claim 1, wherein the fact data comprises:
an entity represented by the first join key; and
a metric associated with the entity.

10. The method of claim 1, wherein the sliding time window feature comprises at least one of:
a sum;
a count;
an average;
a median;
a quantile; and
a weighted aggregation.

11. The method of claim 1, wherein the first join key is associated with at least one of:
a member;
a job; and
a company.

12. A system, comprising:
one or more processors; and
a memory storing instructions that, when executed by the one or more processors, cause the system to:
organize fact data to be aggregated into sliding time window features and observation data associated with the fact data into a set of partitions based on a first join key associated with the fact data and the observation data;
sort the fact data and the observation data within the set of partitions by the first join key and timestamps associated with the fact data and the observation data;
for each observation record in the observation data, aggregate fact records in the sorted fact data that share a value of the first join key with the observation record and fall within a first time window associated with the observation record to produce a sliding time window feature; and
store the sliding time window feature in association with the observation record.

13. The system of claim 12, wherein the memory further stores instructions that, when executed by the one or more processors, cause the system to:
determine, based on the observation data, a time range for aggregating the fact data into the sliding time window feature; and
filter the fact data by the time range prior to organizing the fact data and the observation data into the set of partitions.

14. The system of claim 12, wherein the memory further stores instructions that, when executed by the one or more processors, cause the system to:
for each observation record in the observation data, aggregate the sorted fact data within a second time window associated with the observation record to produce an additional sliding time window feature.

15. The system of claim 12, wherein the memory further stores instructions that, when executed by the one or more processors, cause the system to:
reorganize the fact data and the observation data into another set of partitions based on a second join key associated with the fact data and the observation data; and
sort the fact data and the observation data within the other set of partitions by the second join key and the timestamps; and
for each observation record in the observation data, aggregate the sorted fact data within a second time window associated with the observation record to produce an additional sliding time window feature.

16. The system of claim 12, wherein organizing the fact data and the observation data into the set of partitions based on the first join key comprises:
partitioning the fact data and the observation data by values of the first join key; and
collocating a first partition of the fact data with a second partition of the observation data that shares a value of the first join key with the first partition of the fact data.

17. The system of claim 12, wherein sorting the fact data and the observation data by the first join key and the timestamps comprises:
sorting a set of records in a partition by values of the first join key; and
sorting each subset of the records with a common value of the first join key in the partition by the timestamps.

18. The system of claim 12, wherein the fact data comprises:
an entity represented by the first join key; and
a metric associated with the entity.

19. A non-transitory computer-readable storage medium storing instructions that when executed by a computer cause the computer to perform a method, the method comprising:
organizing fact data to be aggregated into sliding time window features and observation data associated with the fact data into a set of partitions based on a first join key associated with the fact data and the observation data;
sorting the fact data and the observation data within the set of partitions by the first join key and timestamps associated with the fact data and the observation data;
for each observation record in the observation data, aggregating fact records in the sorted fact data that share a value of the first join key with the observation record and fall within a first time window associated with the observation record to produce a sliding time window feature; and
storing the sliding time window feature in association with the observation record.

20. The non-transitory computer-readable storage medium of claim 19, the method further comprising:
reorganizing the fact data and the observation data into another set of partitions based on a second join key associated with the fact data and the observation data;
sorting the fact data and the observation data within the other set of partitions by the second join key and the timestamps; and
for each observation record in the observation data, aggregating the sorted fact data within a second time window associated with the observation record to produce an additional sliding time window feature.

* * * * *